(12) United States Patent
Chiba

(10) Patent No.: US 12,307,898 B2
(45) Date of Patent: May 20, 2025

(54) PARKING LOT MANAGEMENT METHOD AND PARKING LOT MANAGEMENT SYSTEM

(71) Applicant: TOYOTA JIDOSHA KABUSHIKI KAISHA, Toyota (JP)

(72) Inventor: Hiroya Chiba, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 18/462,911

(22) Filed: Sep. 7, 2023

(65) Prior Publication Data

US 2024/0153387 A1    May 9, 2024

(30) Foreign Application Priority Data

Nov. 7, 2022 (JP) .................................. 2022-178261

(51) Int. Cl.
  *G06V 20/54* (2022.01)
  *G08G 1/14* (2006.01)

(52) U.S. Cl.
  CPC ............. *G08G 1/148* (2013.01); *G06V 20/54* (2022.01); *G06V 2201/08* (2022.01)

(58) Field of Classification Search
  None
  See application file for complete search history.

(56) References Cited

U.S. PATENT DOCUMENTS

| | | | |
|---|---|---|---|
| 2020/0070890 A1* | 3/2020 | Hattori | H04W 4/38 |
| 2020/0311621 A1* | 10/2020 | Noguchi | G06Q 10/02 |
| 2020/0361450 A1* | 11/2020 | Noguchi | B62D 15/027 |
| 2022/0253753 A1* | 8/2022 | Baek | G08G 1/143 |

FOREIGN PATENT DOCUMENTS

| | | |
|---|---|---|
| JP | H1097697 A | 4/1998 |
| JP | 2021-51460 A | 4/2021 |
| JP | 2021117816 A | 8/2021 |
| JP | 2021168025 A | 10/2021 |

\* cited by examiner

*Primary Examiner* — John F Mortell
(74) *Attorney, Agent, or Firm* — Dinsmore & Shohl LLP

(57) ABSTRACT

A parking lot includes a plurality of parking spaces monitored by a single camera. A parking lot management method for managing the parking lot includes a parking space allocation process that allocates an available parking space having a highest entry priority among the plurality of parking spaces to an entry vehicle entering the parking lot. The plurality of parking spaces include a first parking space and a second parking space that is closer to an installation position of the single camera than the first parking space is. An entry priority of the first parking space is higher than an entry priority of the second parking space.

9 Claims, 10 Drawing Sheets

PARKING LOT MANAGEMENT METHOD AND PARKING LOT MANAGEMENT SYSTEM

CROSS-REFERENCE TO RELATED APPLICATION

The present disclosure claims priority to Japanese Patent Application No. 2022-178261, filed on Nov. 7, 2022, the contents of which application are incorporated herein by reference in their entirety.

TECHNICAL FIELD

The present disclosure relates to a technique for managing a parking lot. In particular, the present disclosure relates to a technique for managing a parking lot including a plurality of parking spaces monitored by a single camera.

BACKGROUND ART

Patent Literature 1 discloses a parking lot camera installed in a large-scale parking lot in which a plurality of vehicles can be parked in each of a plurality of blocks. The parking lot camera acquires image data of a bird's-eye view of the parking lot. The image data is used for determining whether each block is full or available.

LIST OF RELATED ART

Patent Literature 1: Japanese Laid-Open Patent Application No. JP-2021-168025

SUMMARY

A case where a parking space in a parking lot is monitored by using a camera is considered. For example, a usage status (available or in use) of a parking space is determined based on an image of the parking space captured by the camera.

There may be a need to monitor a plurality of parking spaces with a single camera in order to reduce costs. However, when a plurality of parking spaces are monitored by using a single camera, a part of a certain parking space is likely to be hidden by a parked vehicle parked in an adjacent parking space. In other words, influence of occlusion on visibility of the parking space increases. Decrease in the visibility of the parking space causes decrease in accuracy of monitoring the parking space. For example, when a marker provided in an available parking space cannot be seen from the single camera due to the occlusion, it may be erroneously determined that a vehicle is parked in the available parking space.

An object of the present disclosure is to provide a technique capable of suppressing decrease in accuracy of monitoring when a plurality of parking spaces in a parking lot are monitored by a single camera.

A first aspect is directed to a parking lot management method for managing a parking lot including a plurality of parking spaces monitored by a single camera.

The parking lot management method includes a parking space allocation process that allocates an available parking space having a highest entry priority among the plurality of parking spaces to an entry vehicle entering the parking lot.

The plurality of parking spaces include a first parking space and a second parking space that is closer to an installation position of the single camera than the first parking space is.

An entry priority of the first parking space is higher than an entry priority of the second parking space.

A second aspect is directed to a parking lot management system for managing a parking lot including a plurality of parking spaces monitored by a single camera.

The parking lot management system includes one or more processors.

The one or more processors are configured to execute a parking space allocation process that allocates an available parking space having a highest entry priority among the plurality of parking spaces to an entry vehicle entering the parking lot.

The plurality of parking spaces include a first parking space and a second parking space that is closer to an installation position of the single camera than the first parking space is.

An entry priority of the first parking space is higher than an entry priority of the second parking space.

A third aspect a parking lot management method for managing a parking lot including a plurality of parking spaces monitored by a single camera.

The parking lot management method includes an exit process that causes vehicles parked in the plurality of parking spaces to leave in accordance with exit priorities of the plurality of parking spaces.

The plurality of parking spaces include a first parking space and a second parking space that is closer to an installation position of the single camera than the first parking space is.

An exit priority of the second parking space is higher than an exit priority of the first parking space.

According to the present disclosure, it is possible to suppress the decrease in accuracy of monitoring even in the situation where the plurality of parking spaces are monitored by the single camera.

DETAILED DESCRIPTION

Embodiments of the present disclosure will be described with reference to the accompanying drawings.

1. Overview of Parking Lot and Parking Lot Management System

Figure 1:
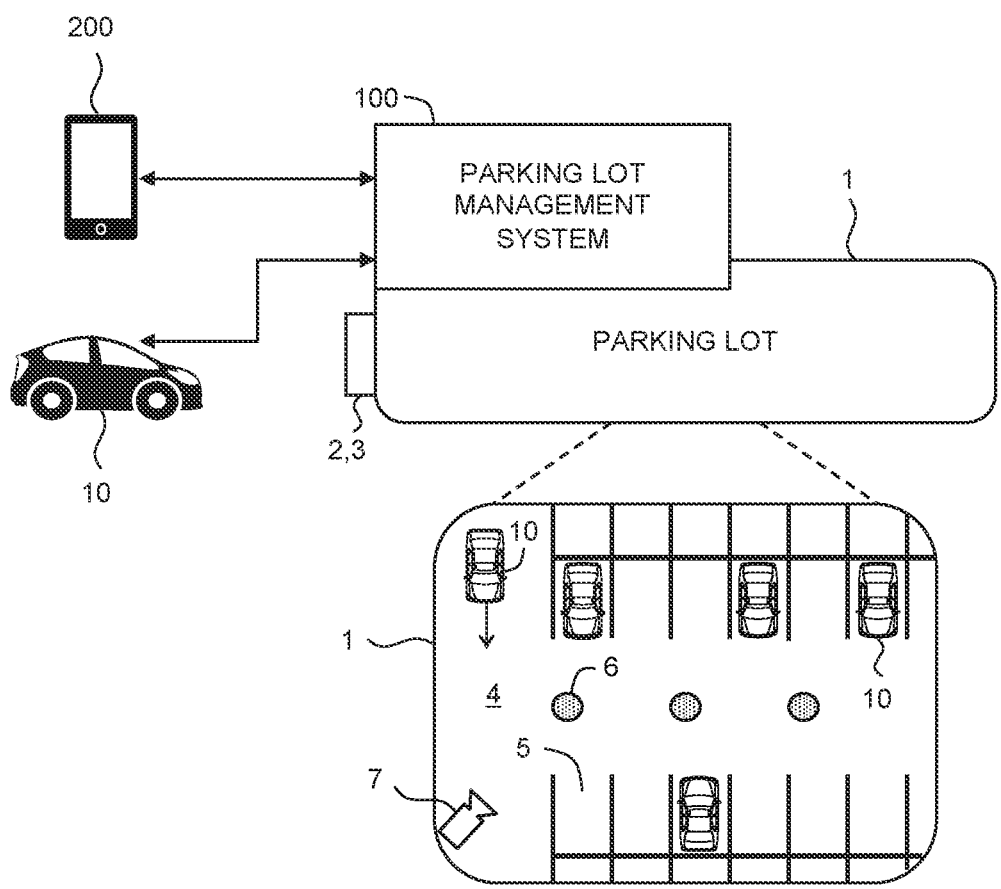
FIG. 1 is a conceptual diagram for explaining an overview of a parking lot and a parking lot management system according to an embodiment.

FIG. 1 is a conceptual diagram for explaining an overview of a parking lot 1 and a parking lot management system 100 according to the present embodiment.

The parking lot 1 includes an entry area 2, an exit area 3, a passage 4, and parking spaces 5. The entry area 2 is an area in which a vehicle 10 entering the parking lot 1 (i.e., an entry vehicle) stops. The exit area 3 is an area in which a vehicle 10 leaving the parking lot 1 (i.e., an exit vehicle) stops. The passage 4 is an area where the vehicle 10 travels. The parking space 5 is a space in which a vehicle 10 is parked. For example, the parking space 5 is partitioned by a partition line.

The parking lot management system 100 manages the parking lot 1. For example, the parking lot management system 100 monitors the parking lot 1 by using a camera 7 installed in the parking lot 1. As another example, the parking lot management system 100 may use the camera 7 to grasp a usage status (available or in use) of each parking space 5. As still another example, the parking lot management system 100 may allocate an available parking space 5 to a vehicle 10 (an entry vehicle) entering the parking lot 1.

The parking lot management system 100 may include a local management device installed in the parking lot 1 and a management center that controls a plurality of parking lots 1.

An automated valet parking (AVP) service may be provided in the parking lot 1. Hereinafter, a case where the automated valet parking service is provided in the parking lot 1 is described.

A vehicle 10 supporting the automated valet parking is able to automatically travel at least in the parking lot 1 without depending on a driving operation by a driver. More specifically, the vehicle 10 is provided with a recognition sensor (e.g., a camera) for recognizing a surrounding situation. The vehicle 10 automatically travels in the parking lot 1 while recognizing the surrounding situation by using the recognition sensor. Markers (landmarks) 6 for guiding the vehicle 10 may be arranged in the parking lot 1. The vehicle 10 acquires an image of the surroundings by using the camera, and recognizes the marker 6 based on the image. Based on a result of recognition of the marker 6, the vehicle 10 is able to estimate a position of vehicle 10 in the parking lot 1 with high accuracy (i.e., localization). The vehicle 10 automatically travels in the parking lot 1 based on the estimated vehicle position. The vehicle 10 may be an autonomous driving vehicle.

The parking lot management system 100 manages the automated valet parking of the vehicle 10 in the parking lot 1. The parking lot management system 100 is capable of communicating with each vehicle 10. In addition, the parking lot management system 100 is capable of communicating with a user terminal 200 of a user of the automated valet parking service. Hereinafter, an example of a flow when a certain user uses the automated valet parking service will be described.

First, the user makes a reservation of the automated valet parking. For example, the user operates the user terminal 200 to input ID information of the user, a desired parking lot 1, a desired date of use, a desired time of use (i.e., a scheduled entry time and a scheduled exit time), and the like. The user terminal 200 sends reservation information including the input information to the parking lot management system 100. The parking lot management system 100 executes reservation processing based on the reservation information/

Entry (check-in) of the vehicle 10 into the parking lot 1 is as follows.

A vehicle 10 carrying the user arrives and stops at the entry area 2 of the parking lot 1. At the entry area 2, the user gets off the vehicle 10. Then, the user requests the entry of the vehicle 10. In response to the entry request, the parking lot management system 100 conducts authentication of the user. Upon completion of the authentication, authority to operate the vehicle 10 is transferred from the user to the parking lot management system 100. The parking lot management system 100 executes an entry process with respect to the vehicle 10.

In the entry process, the parking lot management system 100 communicates with the vehicle 10 to activate the vehicle 10 (power ON).

In addition, the parking lot management system 100 refers to the usage status of each parking space 5 and allocates an available parking space 5 to the vehicle 10. Then, the parking lot management system 100 communicates with the vehicle 10 to send an entry instruction to the vehicle 10. The entry instruction includes information of the allocated parking space 5 and map information of the parking lot 1. The parking lot management system 100 may designate a target route from the entry area 2 to the allocated parking space 5.

In response to the entry instruction, the vehicle 10 initiates vehicle travel control. More specifically, the vehicle 10 automatically travels from the entry area 2 to the allocated parking space 5 and automatically parks in the allocated parking space 5. At this time, the vehicle 10 may travel along the target route designated by the parking lot management system 100. The parking lot management system 100 may communicate with the vehicle 10 to remotely control the automatic travel of the vehicle 10.

Upon completion of the parking, the vehicle 10 notifies the parking lot management system 100 of the parking completion. Alternatively, the parking lot management system 100 may use an infrastructure sensor installed in the parking lot 1 to detect completion of the parking of the vehicle 10. After the parking is completed, the parking lot management system 100 communicates with the vehicle 10 to deactivate the vehicle 10 (power OFF).

Exit (check-out) of the vehicle 10 from the parking lot 1 is as follows.

The user requests the exit of the vehicle 10 by using the user terminal 200. In response to the exit request, the parking lot management system 100 conducts authentication of the user and executes an exit process with respect to the vehicle 10.

In the exit process, the parking lot management system 100 communicates with the vehicle 10 to activate the vehicle 10 (power ON).

In addition, the parking lot management system 100 communicates with the vehicle 10 to send an exit instruction to the vehicle 10. The exit instruction includes a position of the exit area 3 and the map information of the parking lot 1. The parking lot management system 100 may designate a target route from the parking space 5 to the exit area 3.

In response to the exit instruction, the vehicle 10 initiates the vehicle travel control. More specifically, the vehicle 10 automatically travels from the parking space 5 to the exit area 3. At this time, the vehicle 10 may travel along the target route designated by the parking lot management system 100. The parking lot management system 100 may communicate with the vehicle 10 to remotely control the automatic travel of the vehicle 10.

The vehicle 10 arrives and stops at the exit area 3. The authority to operate the vehicle 10 is transferred from the parking lot management system 100 to the user. The user gets on the vehicle 10. The vehicle 10 starts moving toward a next destination.

2. Parking Space Monitoring Process

The parking lot management system 100 according to the present embodiment monitors each parking space 5 in the parking lot 1 by using the camera 7 installed in the parking lot 1. Hereinafter, this process is referred to as a "parking space monitoring process." For example, the parking space monitoring process is performed for grasping the usage status (available or in use) of each parking space 5. As another example, the parking space monitoring process may be performed for checking whether the vehicle 10 has safely arrived at the allocated parking space 5. As still another example, the parking space monitoring process also is useful for monitoring vandalism to the vehicle 10 parked in the parking space 5.

Figure 2:
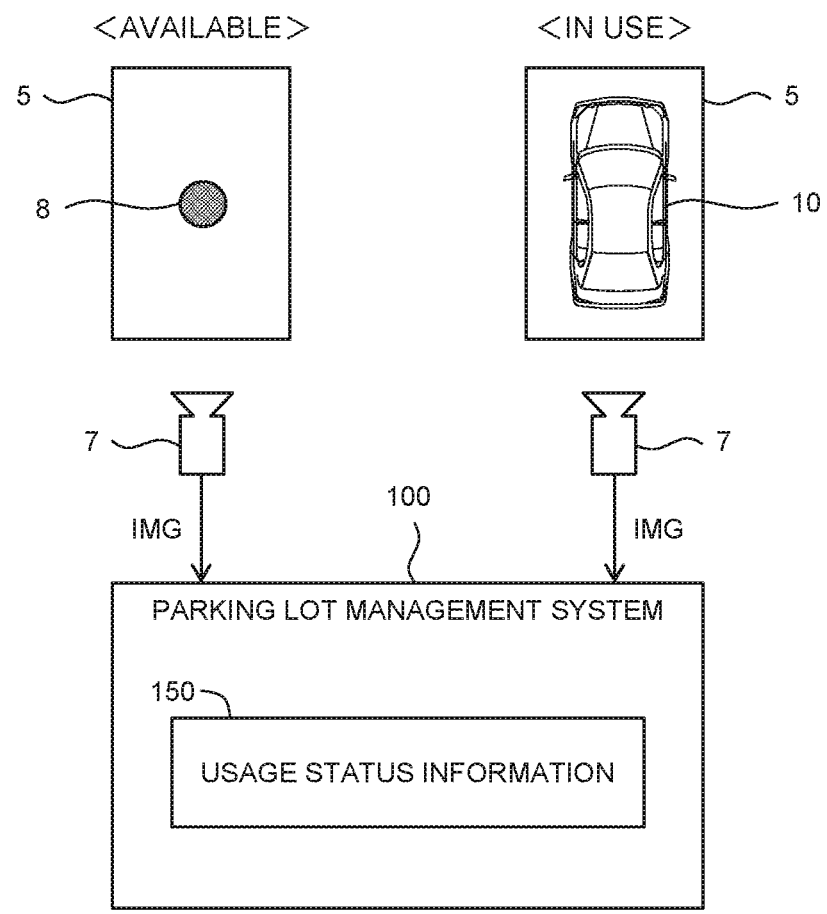
FIG. 2 is a conceptual diagram for explaining an example of a method for determining a usage status (available or in use) of a parking space.

FIG. 2 is a conceptual diagram for explaining an example of a method for determining the usage status of the parking space 5. The camera 7 takes a picture of the parking space 5 and acquires an image IMG including the parking space 5. The parking lot management system 100 communicates with the camera 7 to acquire the image IMG captured by the camera 7. Then, the parking lot management system 100 determines the usage status of the parking space 5 based on the image IMG of the parking space 5.

For example, each parking space 5 is provided with a recognition target 8. The recognition target 8 is, for example, a marker drawn on a road surface. When a vehicle 10 is parked in the parking space 5, the recognition target 8 provided in the parking space 5 is hidden by the vehicle 10 and cannot be seen from the camera 7. Therefore, the parking lot management system 100 is able to determine the usage status of the parking space 5 based on whether or not the recognition target 8 is visible from the camera 7. More specifically, the parking lot management system 100 analyzes the image IMG of the parking space 5 to determine whether or not the recognition target 8 is included in the image IMG. When the recognition target 8 is included in the image IMG, the parking lot management system 100 determines that the parking space 5 is available. On the other hand, when the recognition target 8 is not included in the image IMG, the parking lot management system 100 determines that the parking space 5 is in use.

As another example, the parking lot management system 100 may hold, as a reference image, an image IMG of the parking space 5 in an available state in which no vehicle 10 is parked. In this case, parking lot management system 100 is able to determine the usage status of the parking space 5 by comparing the image IMG of the parking space 5 with the reference image.

Usage status information 150 indicates the usage status (available or in use) of each parking space 5 in the parking lot 1. The parking lot management system 100 updates the usage status information 150 through the parking space monitoring process. In addition, the parking lot management system 100 is able to grasp which parking space 5 in the parking lot 1 is currently available by referring to the usage status information 150. Typically, the usage status information 150 is used when allocating an available parking space 5 to a vehicle 10 (an entry vehicle) entering the parking lot 1.

There may be a need to monitor a plurality of parking spaces 5 with a single camera 7 in order to reduce costs.

Figure 3:
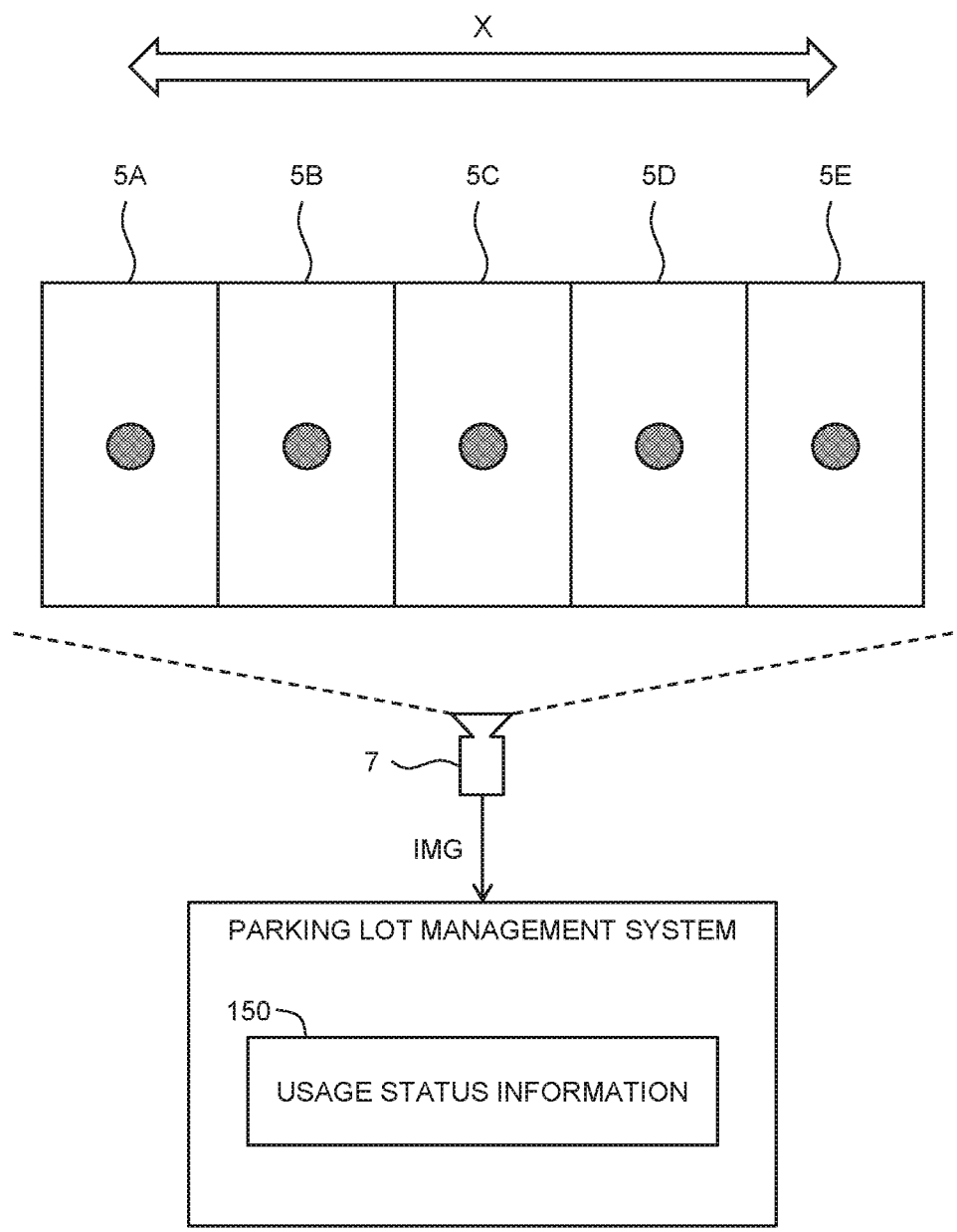
FIG. 3 is a conceptual diagram showing an example of a case where a plurality of parking spaces are monitored by a single camera.

FIG. 3 shows an example of a case where a plurality of parking spaces 5 are monitored by a single camera 7. In the example shown in FIG. 3, a plurality of parking spaces 5A to 5E are arranged in series in a first direction X. Each parking space 5 may be in contact with an adjacent parking space 5. The single camera 7 is located so as to be able to take a picture of all of the plurality of parking spaces 5A to 5E. For example, the single camera 7 is located above a center parking space 5C. However, the location of the single camera 7 is not limited thereto.

Figure 4:
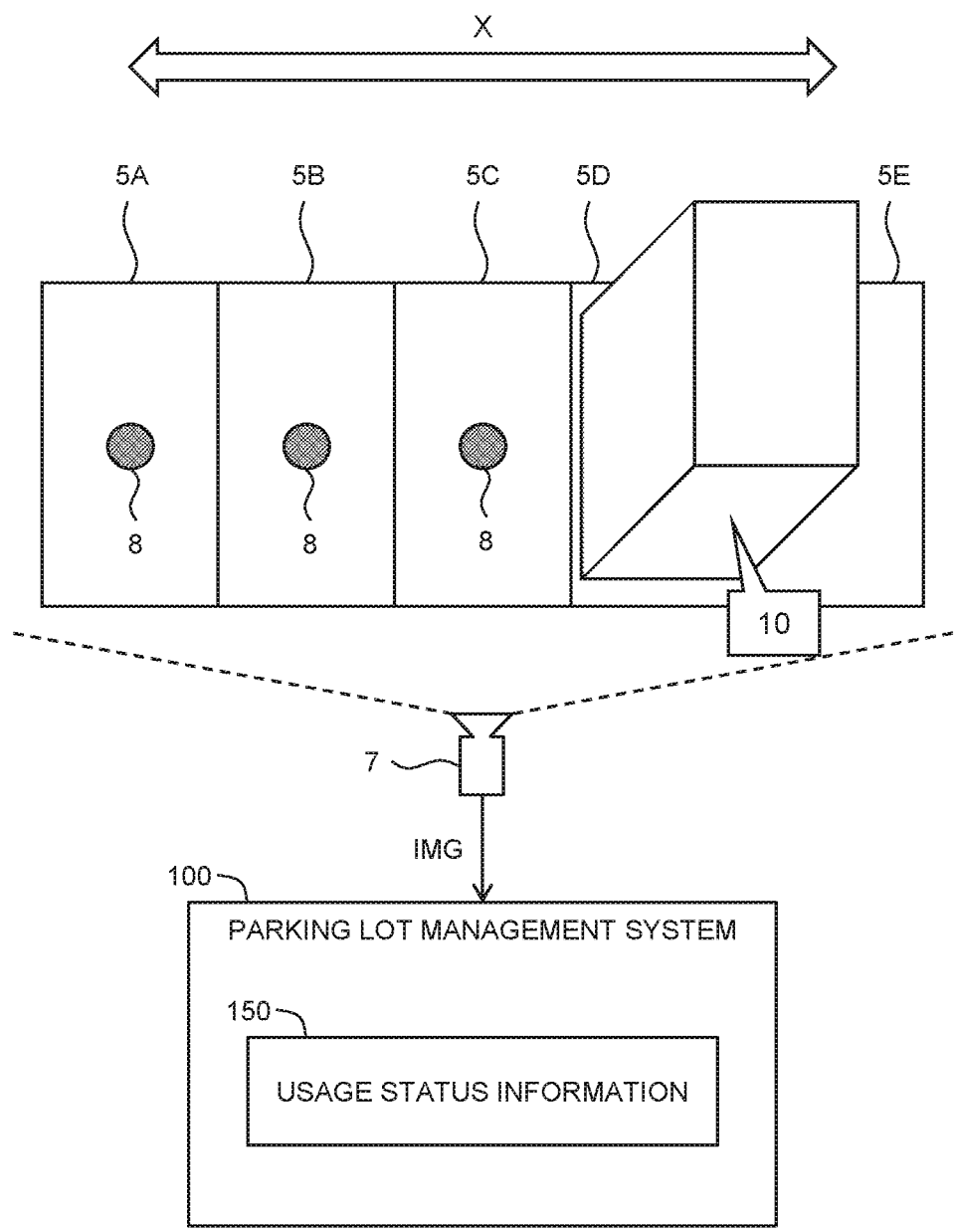
FIG. 4 is a conceptual diagram for explaining an issue.

FIG. 4 is a conceptual diagram for explaining an issue. In the example shown in FIG. 4, the single camera 7 is located above the center parking space 5C. A relatively tall vehicle 10 is parked in a parking space 5D. The other parking spaces 5A, 5B, 5C, and 5E are available. The vehicle 10 parked in the parking space 5D hides the recognition target 8 provided in the adjacent parking space 5E. That is, when viewed from the single camera 7, the recognition target 8 of the parking space 5E is in a blind spot. In this case, the recognition target 8 of the parking space 5E is not included in the image IMG captured by the single camera 7. Therefore, the parking space 5E, which is actually available, may be erroneously determined to be "in use." That is, accuracy of determination of the usage status of the parking space 5 may be reduced.

This can be generalized as follows. When a plurality of parking spaces 5 are monitored by using a single camera 7, a part of a certain parking space 5 is likely to be hidden by a vehicle 10 parked in an adjacent parking space 5. In other words, influence of occlusion on visibility of the parking space 5 increases. Decrease in the visibility of the parking space 5 causes decrease in accuracy of monitoring the parking space 5.

In view of the above, the present disclosure proposes a technique capable of suppressing the decrease in accuracy of monitoring when the plurality of parking spaces 5 are monitored by the single camera 7.

3. Parking Space Allocation Process

The parking lot management system 100 allocates an available parking space 5 to a vehicle 10 (entry vehicle) entering the parking lot 1. Hereinafter, this process is referred to as a "parking space allocation process." According to the present embodiment, the parking space allocation process has a feature for suppressing the decrease in accuracy of monitoring.

Figure 5:
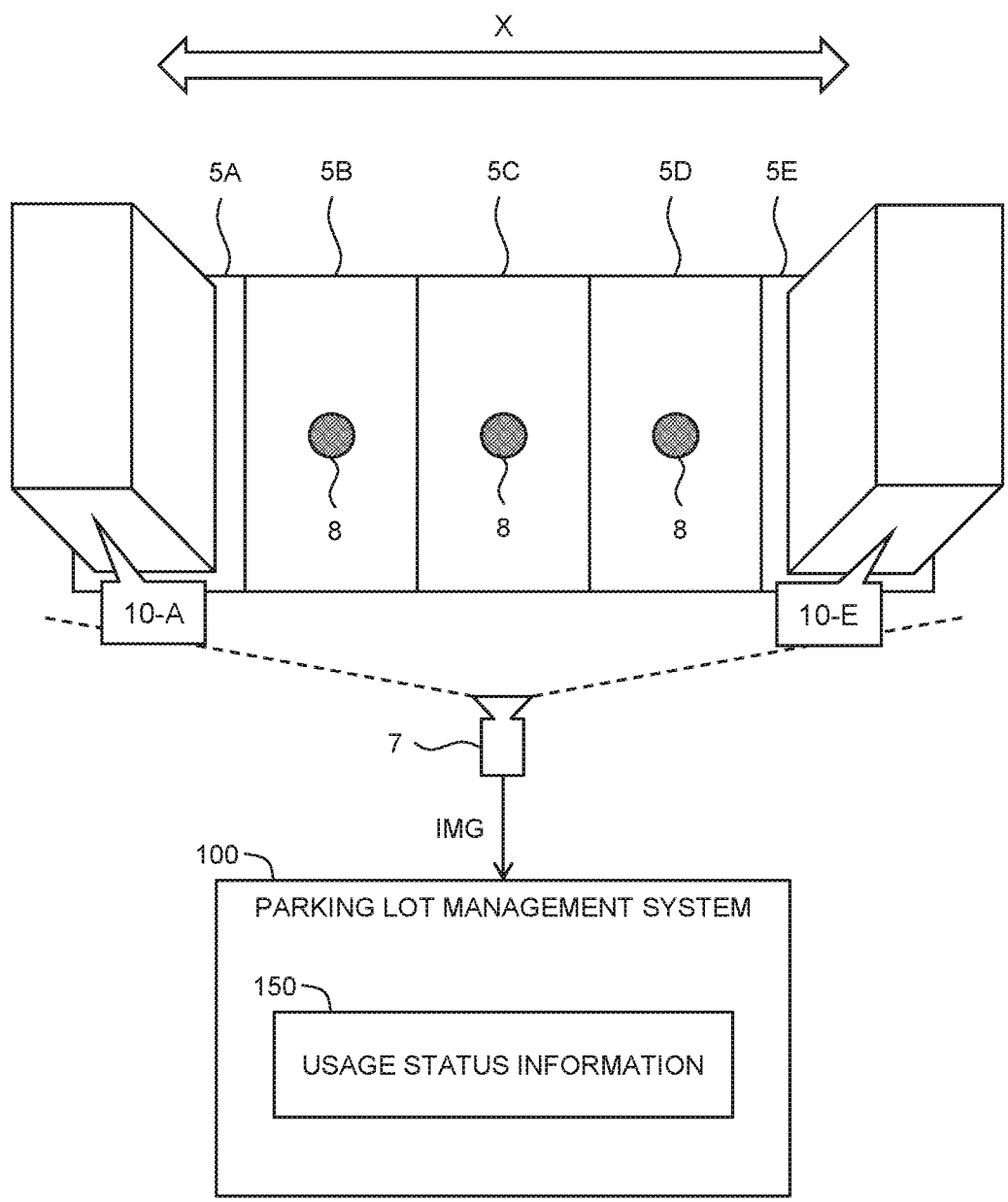
FIG. 5 is a conceptual diagram for explaining a parking space allocation process according to an embodiment.
Figure 6:
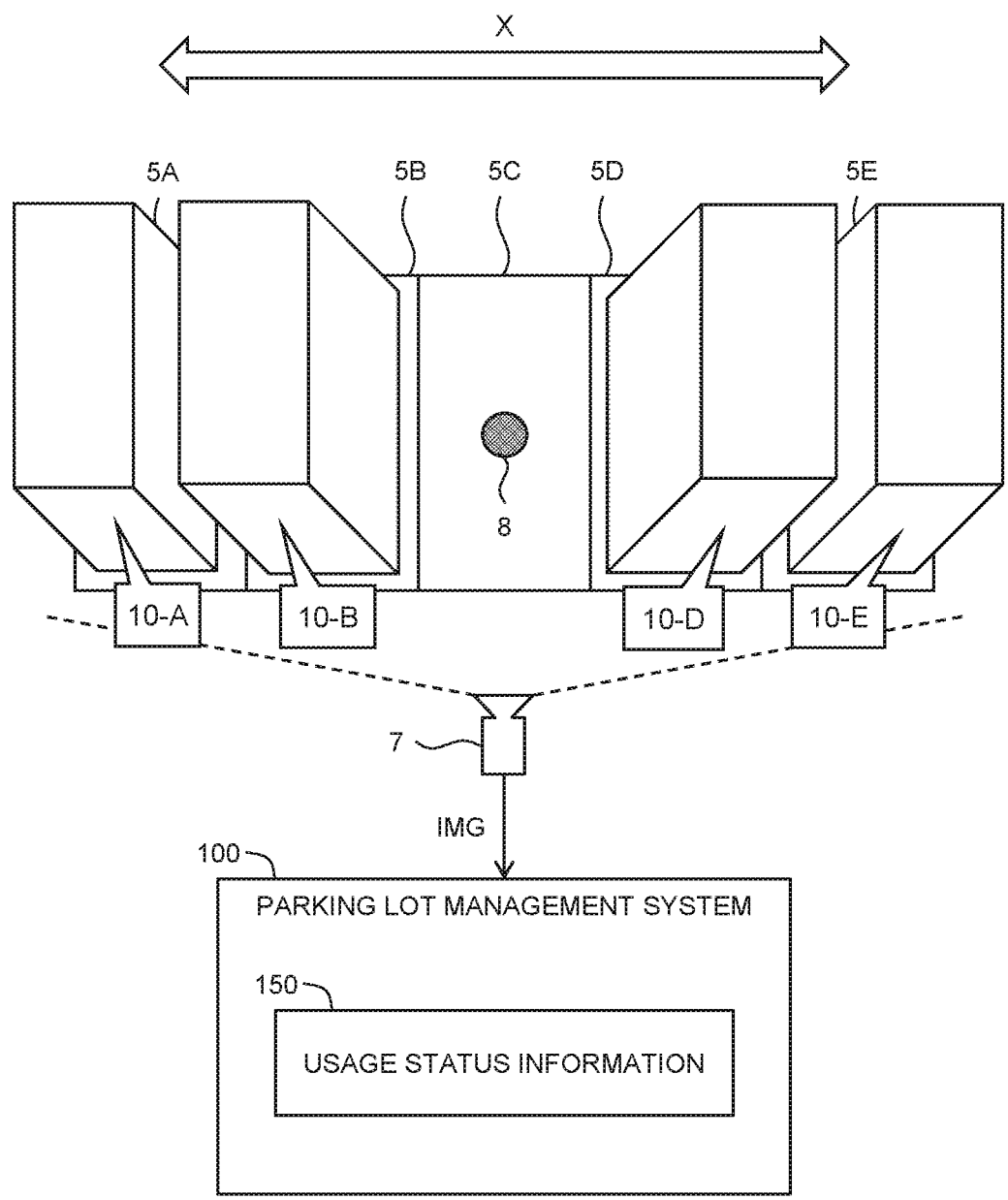
FIG. 6 is a conceptual diagram for explaining a parking space allocation process according to an embodiment.

FIGS. 5 and 6 are conceptual diagrams for explaining the parking space allocation process according to the present embodiment. The arrangement of the parking spaces 5A to 5E and the single camera 7 is the same as that shown in FIG. 4. It is assumed that all of the parking spaces 5A to 5E are available at the beginning.

Thereafter, a vehicle 10 enters the parking lot 1. The parking space 5A or the parking space 5E farthest from the camera 7 among the parking spaces 5A to 5E is allocated to the entry vehicle. FIG. 5 shows a state in which vehicles 10-A and 10-E are parked in the parking spaces 5A and 5E, respectively. The recognition targets 8 of the parking spaces 5A and 5E are hidden by the parked vehicles 10-A and 10-E, respectively. Therefore, the parking spaces 5A and 5E are correctly determined to be "in use." On the other hand, the recognition targets 8 of the parking spaces 5B, 5C, and 5D are not hidden by the parked vehicles 10-A and 10-E. That is, the recognition targets 8 of the parking spaces 5B, 5C, and 5D is visible from the single camera 7. Therefore, the parking spaces 5B, 5C, and 5D are correctly determined to be "available."

Thereafter, another vehicle 10 enters the parking lot 1. A parking space 5B adjacent to the parking space 5A or a parking space 5D adjacent to the parking space 5E is allocated to the entry vehicle. FIG. 6 shows a state in which vehicles 10-A, 10-B, 10-D, and 10-E are parked in the parking spaces 5A, 5B, 5D, and 5E, respectively. The recognition targets 8 of the parking spaces 5B and 5D are hidden by the parked vehicles 10-B and 10-D, respectively. Therefore, the parking spaces 5B and 5D are correctly determined to be "in use." On the other hand, the recognition target 8 of the parking space 5C is not hidden by the parked vehicles 10. That is, the recognition target 8 of the parking space 5C is visible from the single camera 7. Therefore, the parking space 5C is correctly determined to be "available."

It should be noted that in FIG. 6, the recognition target 8 of the parking space 5A may be in a blind spot caused by the vehicle 10-B parked in the adjacent parking space 5B. However, before that, the recognition target 8 of the parking space 5A is already hidden by the vehicle 10-A. Therefore, even if the vehicle 10-B is newly parked in the parking space 5B, the visibility of the recognition target 8 of the parking space 5A is unchanged. The parking space 5A is correctly determined to be "in use." The same applies to the parking space 5E.

From the above point of view, according to the present embodiment, an order of the parking spaces 5 allocated to the entry vehicle is set in advance. In other words, priorities are set to the plurality of parking spaces 5A to 5E. The priority at the time of the entry is hereinafter referred to as an "entry priority."

Figure 7:
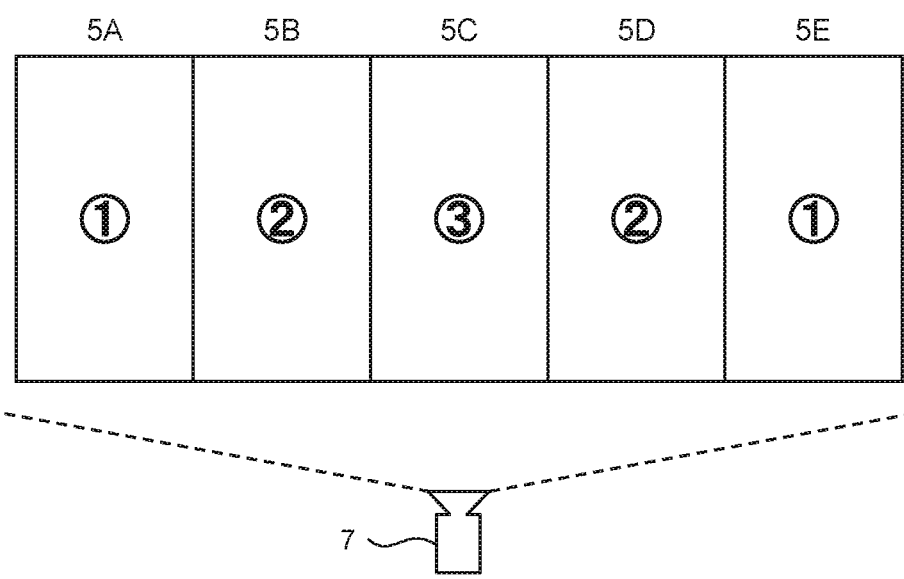
FIG. 7 is a conceptual diagram showing an example of entry priorities of a plurality of parking spaces according to an embodiment.

FIG. 7 is a conceptual diagram showing an example of the entry priorities of the plurality of parking spaces 5A to 5E. The arrangement of the parking spaces 5A to 5E and the single camera 7 is the same as that shown in FIGS. 4 to 6 described above. The parking space 5A and the parking space 5E that are farthest from the camera 7 have the highest entry priorities. The parking space 5B and the parking space 5D which are the second farthest from the camera 7 have the second highest entry priorities. The parking space 5C closest to the camera 7 has the lowest entry priority.

This can be generalized as follows. The plurality of parking spaces 5 monitored by the single camera 7 include a first parking space 5-1 and a second parking space 5-2. The first parking space 5-1 is relatively far from an installation position of the camera 7, and the second parking space 5-2 is relatively close to the installation position of the camera 7. In other words, the second parking space 5-2 is closer to the installation position of the camera 7 than the first parking space 5-1 is. In this case, the entry priority of the first parking space 5-1 is higher than the entry priority of the second parking space 5-2.

The parking lot management system 100 performs the parking space allocation process in consideration of the entry priorities of the plurality of parking spaces 5 monitored by the single camera 7. More specifically, in accordance with the entry priorities, the parking lot management system 100 allocates an available parking space among the plurality of parking spaces 5 to the entry vehicle entering the parking lot 1. In other words, the parking lot management system 100 allocates an available parking space having the highest entry priority among the plurality of parking spaces 5 to the entry vehicle. For example, the parking lot management system 100 refers to the usage status information 150 to determine whether or not the parking space 5 is available in descending order of the entry priorities. Then, the parking lot management system 100 allocates an available parking space having the highest entry priority to the entry vehicle.

As a result of such the parking space allocation process considering the entry priorities, the influence of occlusion caused by the entry vehicle is suppressed. Therefore, even in the situation where the plurality of parking spaces 5 are monitored by the single camera 7, it is possible to suppress the decrease in accuracy of monitoring. For example, a probability that a vehicle 10 parked in a certain parking space 5 hides the recognition target 8 of the adjacent parking space 5 is reduced. Therefore, a possibility that an actually available parking space 5 is erroneously determined to be "in use" is reduced. This contributes to improvement in accuracy and reliability of the parking space allocation process.

4. Reallocation Process

After vehicles 10 are parked in at least some of the plurality of parking spaces 5, relocation of a vehicle 10 may be performed as necessary. That is, the parking lot management system 100 may newly allocate another parking space 5 to a vehicle 10 parked in any parking space 5 as necessary. This process is hereinafter referred to as a "reallocation process."

Figure 8:
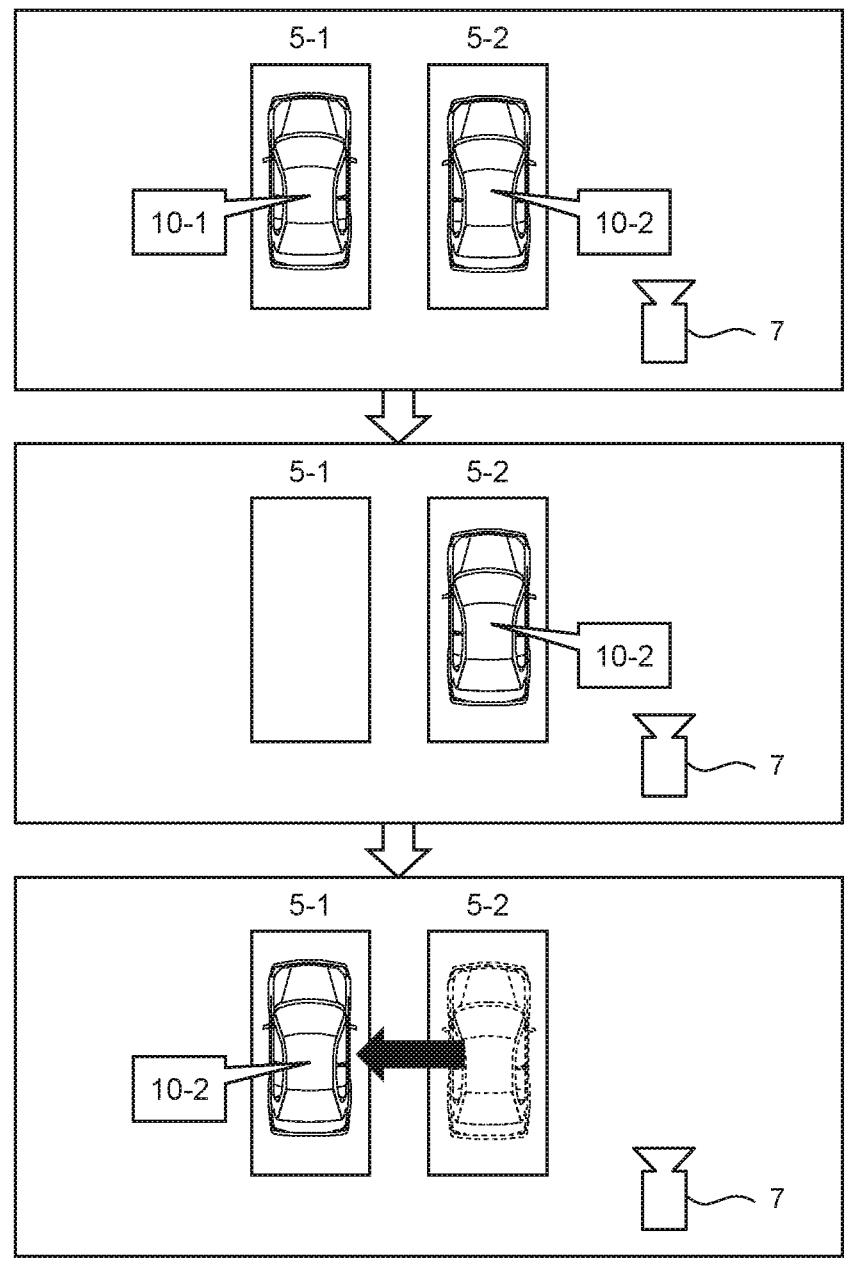
FIG. 8 is a conceptual diagram for explaining a reallocation process according to an embodiment.

FIG. 8 is a conceptual diagram for explaining the reallocation process. Here, the above-described first parking space 5-1 and second parking space 5-2 having different entry priorities are considered. The entry priority of the first parking space 5-1 is higher than the entry priority of the second parking space 5-2. At a time of entry of a first vehicle 10-1, the first parking space 5-1 is allocated to the first vehicle 10-1, and then the first vehicle 10-1 is parked in the first parking space 5-1. Thereafter, at a time of entry of a second vehicle 10-2, the second parking space 5-2 is allocated to the second vehicle 10-2, and then the second vehicle 10-2 is parked in the second parking space 5-2.

Thereafter, the first vehicle 10-1 leaves the first parking space 5-1. As a result, the first parking space 5-1 having a higher entry priority than the second parking space 5-2 becomes an available parking space. In this case, the parking lot management system 100 newly allocates the first parking space 5-1 to the second vehicle 10-2 parked in the second parking space 5-2. The second vehicle 10-2 moves from the second parking space 5-2 to the newly allocated first parking space 5-1.

After that, when a new entry vehicle enters, the second parking space 5-2 is allocated to the entry vehicle. That is, it is prevented that the first parking space 5-1 having a higher entry priority is allocated to the new entry vehicle under a situation that the second vehicle 10-2 is parked in the second parking space 5-2 having a lower entry priority.

By performing the reallocation process as described above, it is possible to continue the effect of the above-described parking space allocation process for a longer time.

5. Exit Process Considering Priority

It is also possible to apply the automated valet parking technique to a parking lot of a rent-a-car facility. In this case, a plurality of vehicles 10 to be lent to users are parked in the parking lot 1. When a user rents a vehicle 10, the exit process is performed. At this time, a staff of the rent-a-car facility need not move the vehicle 10 from a parking space 5 to a pick-up area (i.e., exit area 3), but a designated vehicle 10 automatically travels and moves to the pick-up area.

A situation in which a plurality of vehicles 10 are respectively parked in a plurality of parking spaces 5 monitored by a single camera 7 will be considered. There may be a case where any of the plurality of vehicles 10 may be designated in the exit process. For example, when there is only one type of vehicle 10 to be lent to the user, any vehicle 10 in any parking space 5 may be designated. As another example, when vehicles 10 of a vehicle type desired by a user are respectively parked in the plurality of parking spaces 5, any vehicle 10 of any parking space 5 may be designated.

From the same point of view as in the parking space allocation process at the time of the entry, priorities may be set to the plurality of parking spaces 5 also in the exit process. Hereinafter, the priority at the time of the exit is referred to as an "exit priority."

Figure 9:
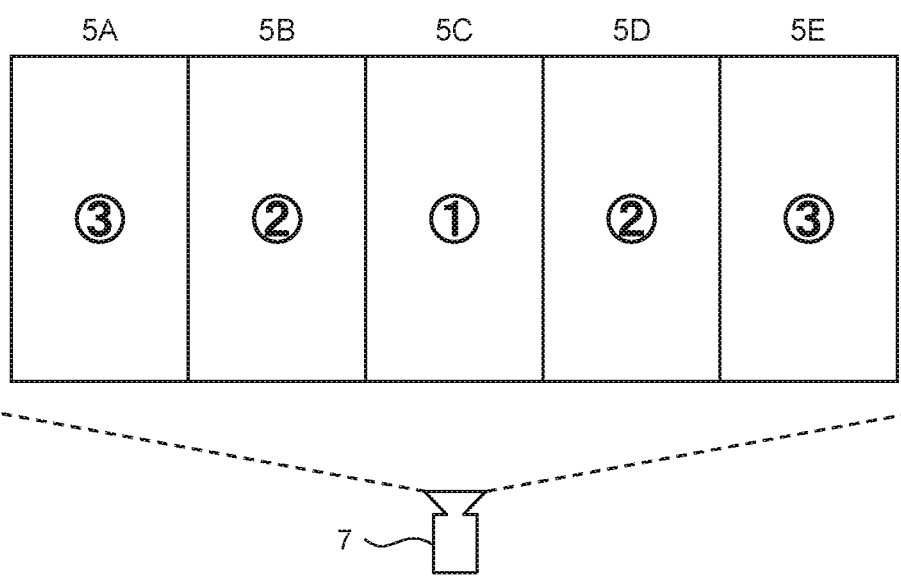
FIG. 9 is a conceptual diagram showing an example of exit priorities of a plurality of parking spaces according to an embodiment.

FIG. 9 is a conceptual diagram showing an example of the exit priorities of the plurality of parking spaces 5A to 5E. The arrangement of the parking spaces 5A to 5E and the single camera 7 is the same as that shown in FIGS. 4 to 6 described above. The exit priorities are opposite to the entry priorities shown in FIG. 7. That is, the parking space 5C closest to the camera 7 has the highest exit priority. On the other hand, the parking space 5A and the parking space 5E that are farthest from the camera 7 have the lowest exit priorities.

This can be generalized as follows. The plurality of parking spaces 5 monitored by the single camera 7 include a first parking space 5-1 and a second parking space 5-2. The first parking space 5-1 is relatively far from an installation position of the camera 7, and the second parking space 5-2 is relatively close to the installation position of the camera 7. In other words, the second parking space 5-2 is closer to the installation position of the camera 7 than the first parking space 5-1 is. In this case, the exit priority of the second parking space 5-2 is higher than the exit priority of the first parking space 5-1.

The parking lot management system 100 performs the exit process in consideration of the exit priorities of the plurality of parking spaces 5 monitored by the single camera 7. More specifically, the parking lot management system 100 causes vehicles 10 parked in the plurality of parking spaces 5 to leave in accordance with the exit priorities of the plurality of parking spaces 5. Thus, the influence of occlusion is suppressed. Therefore, even in the situation where the plurality of parking spaces 5 are monitored by the single camera 7, it is possible to suppress the decrease in accuracy of monitoring.

It should be noted that a combination of the above-described Sections 3 and 4 and the Section 5 is also possible.

6. Example of Parking Lot Management System

Figure 10:
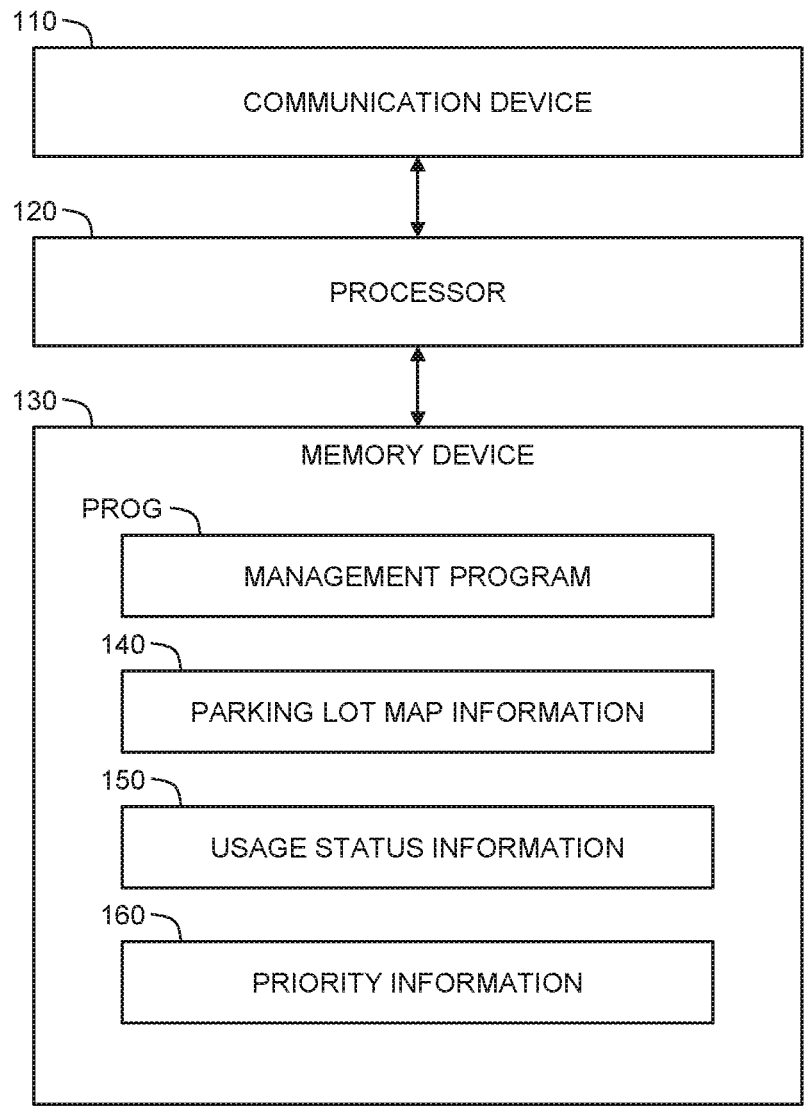
FIG. 10 is a block diagram showing a configuration example of a parking lot management system according to an embodiment.

FIG. 10 is a block diagram showing a configuration example of the parking lot management system 100 according to the present embodiment. The parking lot management system 100 includes a communication device 110, one or more processors 120 (hereinafter simply referred to as a processor 120), and one or more memory devices 130 (hereinafter simply referred to as a memory device 130).

The communication device 110 communicates with the camera 7 installed in the parking lot 1. In addition, the communication device 110 communicates with the vehicle 10 and the user terminal 200 (see FIG. 1).

The processor 120 executes a variety of processing. For example, the processor 120 includes a central processing unit (CPU). The processor 120 executes a variety of processing related to the management of the parking lot 1. For example, the processor 120 communicates with the camera 7, the vehicle 10, the user terminal 200, and the like via the communication device 110. Moreover, the processor 120 executes the parking space monitoring process described above (see Section 2). Furthermore, the processor 120 executes the parking space allocation process described above (see Section 3).

The memory device 130 stores a variety of information necessary for the processing by the processor 120. Examples of the memory device 130 include a volatile memory, a nonvolatile memory, a hard disk drive (HDD), a solid state drive (SSD), and the like. The processor 120 reads out a variety of information from the memory device 130 and stores a variety of information in the memory device 130.

A management program PROG is a computer program for managing the parking lot 1. A variety of functions of the parking lot management system 100 (the processor 120) may be implemented by the processor 120 executing the management program PROG. The management program PROG is stored in the memory device 130. The management program PROG may be recorded on a non-transitory computer-readable recording medium.

The memory device 130 also stores parking lot map information 140, usage status information 150, priority information 160, and the like.

The parking lot map information 140 is map information of the parking lot 1. The parking lot map information 140 indicates an arrangement of the entry area 2, the exit area 3, the passage 4, the parking spaces 5, the markers 6, the camera 7, the recognition targets 8, and the like in the parking lot 1. A positional relationship between the single camera 7 and the plurality of parking spaces 5 can be obtained from the parking lot map information 140.

The usage status information 150 indicates the usage status (available or in use) of each parking space 5 in the parking lot 1. Typically, the usage status information 150 is used in the parking space allocation process.

The priority information 160 indicates the entry priorities (see FIG. 7) of the plurality of parking spaces 5 monitored by the single camera 7. In addition, the priority information 160 indicates the exit priorities (see FIG. 9) of the plurality of parking spaces 5 monitored by the single camera 7.

The processor 120 executes the "parking space monitoring process" described in the above Section 2. More specifically, the processor 120 acquires the image IMG captured by the camera 7 via the communication device 110. Then, the processor 120 monitors each parking space 5 based on the image IMG. For example, the processor 120 determines the usage status of each parking space 5 based on the image IMG. The processor 120 updates the usage status information 150 based on a result of the parking space monitoring process.

The processor 120 further executes the "parking space allocation process" described in the above Section 3. More specifically, the processor 120 grasps which parking space 5 in the parking lot 1 is currently available by referring to the usage status information 150. In addition, the processor 120 acquires information on the entry priorities of the plurality of parking spaces 5 from the priority information 160. Then, the processor 120 allocates an available parking space among the plurality of parking spaces 5 to an entry vehicle in accordance with the entry priorities. In other words, the processor 120 allocates an available parking space having the highest entry priority among the plurality of parking spaces 5 to the entry vehicle.

The processor 120 further executes the "reallocation process" described in the above Section 4. More specifically, the processor 120 performs the exit process with respect to a vehicle 10 parked in a certain parking space 5. A relationship of the entry priority between the parking space 5 that newly becomes available as a result of the exit process and the parking space 5 in use can be seen from the usage status information 150 and the priority information 160. The processor 120 executes the reallocation process as necessary based on the usage status information 150 and the priority information 160.

The processor 120 further executes the "exit process" described in the above Section 5. More specifically, the processor 120 acquires information on the exit priorities of the plurality of parking spaces 5 from the priority information 160. Then, the processor 120 causes the vehicles 10 parked in the plurality of parking spaces 5 to leave in accordance with the exit priorities.

What is claimed is:

1. A parking lot management method for managing a parking lot including a plurality of parking spaces monitored by a single camera,
    the parking lot management method comprising a parking space allocation process that allocates an available parking space having a highest entry priority among the plurality of parking spaces to an entry vehicle entering the parking lot, wherein
    the plurality of parking spaces include a first parking space and a second parking space that is closer to an installation position of the single camera than the first parking space is,
    an entry priority of the first parking space is higher than an entry priority of the second parking space, and
    based on the entry priority, an entry instruction is transmitted and travel control is initiated to cause the entry vehicle to automatically travel from an entry area of the parking lot to the allocated available parking space in accordance with a first target route in response to the entry instruction.

2. The parking lot management method according to claim 1, further comprising a reallocation process that newly allocates another parking space to a vehicle parked in one of the plurality of parking spaces, wherein
    when a first vehicle is parked in the first parking space, a second vehicle is parked in the second parking space, and thereafter the first vehicle leaves the first parking space, the reallocation process includes newly allocating the first parking space to the second vehicle.

3. The parking lot management method according to claim 1, further comprising an exit process that causes vehicles parked in the plurality of parking spaces to leave in accordance with exit priorities of the plurality of parking spaces, wherein
    an exit priority of the second parking space is higher than an exit priority of the first parking space.

4. The parking lot management method according to claim 1, further comprising a parking space monitoring process that determines a usage status of each of the plurality of parking spaces based on an image captured by the single camera.

5. A parking lot management system for managing a parking lot including a plurality of parking spaces monitored by a single camera,
    the parking lot management system comprising one or more processors configured to execute a parking space allocation process that allocates an available parking space having a highest entry priority among the plurality of parking spaces to an entry vehicle entering the parking lot, wherein
    the plurality of parking spaces include a first parking space and a second parking space that is closer to an installation position of the single camera than the first parking space is,
    an entry priority of the first parking space is higher than an entry priority of the second parking space, and
    based on the entry priority, the one or more processors are configured to transmit an entry instruction and initiate travel control to cause the entry vehicle to automatically travel from an entry area of the parking lot to the allocated available parking space in accordance with a first target route in response to the entry instruction.

6. A parking lot management method for managing a parking lot including a plurality of parking spaces monitored by a single camera,
    the parking lot management method comprising an exit process that causes vehicles parked in the plurality of parking spaces to leave in accordance with exit priorities of the plurality of parking spaces, wherein
    the plurality of parking spaces include a first parking space and a second parking space that is closer to an installation position of the single camera than the first parking space is,
    an exit priority of the second parking space is higher than an exit priority of the first parking space, and
    based on the exit priority, an exit instruction is transmitted and travel control is initiated to cause one of the vehicles to automatically travel from one of the plurality of parking spaces to an exit area of the parking lot in accordance with a second target route in response to the exit instruction.

7. The parking lot management method according to claim 3, wherein based on the exit priority, an exit instruction is transmitted and the travel control is initiated to cause the entry vehicle to automatically travel from the allocated available parking space to an exit area of the parking lot in accordance with a second target route in response to the exit instruction.

8. The parking lot management method according to claim 1, further comprising automatically controlling parking, in response to the entry instruction, of the entry vehicle in the allocated parking space.

9. The parking lot management method according to claim 4, wherein the parking space monitoring process is executed by a processor that acquires the image captured by the single camera via a communication device, and further comprising updating the usage status based on a result of the parking space monitoring process.

* * * * *